United States Patent
Antal, Sr.

(10) Patent No.: US 7,819,347 B2
(45) Date of Patent: Oct. 26, 2010

(54) METERED MATERIAL DISPENSER

(75) Inventor: Keith E. Antal, Sr., Valatie, NY (US)

(73) Assignee: Restaurant Technology, Inc., Oak Brook, IL (US)

(*) Notice: Subject to any disclaimer, the term of this patent is extended or adjusted under 35 U.S.C. 154(b) by 206 days.

(21) Appl. No.: 11/810,992

(22) Filed: Jun. 7, 2007

(65) Prior Publication Data

US 2007/0284396 A1 Dec. 13, 2007

Related U.S. Application Data

(60) Provisional application No. 60/811,987, filed on Jun. 8, 2006.

(51) Int. Cl.
*A01C 3/06* (2006.01)
*E01C 19/20* (2006.01)

(52) U.S. Cl. .................. 239/689; 239/650; 239/652; 222/456; 222/441; 222/454

(58) Field of Classification Search ............... 222/441, 222/454, 455, 456; 239/650, 652, 689, 288, 239/288.5, 461
See application file for complete search history.

(56) References Cited

U.S. PATENT DOCUMENTS

| | | | |
|---|---|---|---|
| 576,241 A | 2/1897 | Van Ame | |
| 845,347 A | 2/1907 | Gesell | |
| 903,548 A | 11/1908 | De Hayes | |
| 913,027 A | 2/1909 | Meaker | |
| 934,493 A | 9/1909 | Wolkenstein | |
| 1,618,688 A | 2/1927 | Tempest | |
| 1,707,967 A | 4/1929 | Abbott | |
| 1,727,799 A * | 9/1929 | Abbott | 222/251 |
| 1,763,449 A | 6/1930 | Trautvetter | |
| 1,877,808 A | 9/1932 | Cagliostro | |
| 1,941,745 A * | 1/1934 | Higley | 222/456 |
| 1,982,094 A | 11/1934 | Gessler | |
| 2,136,805 A | 11/1938 | Scharinger | |
| 2,604,235 A | 7/1952 | Teston | |
| 2,644,616 A | 7/1953 | Gordon | |
| 2,704,623 A | 3/1955 | Yasso | |
| 2,980,297 A * | 4/1961 | Tucci | 222/158 |
| 3,323,683 A | 6/1967 | Cianciolo | |
| 3,344,962 A | 10/1967 | Popivalo | |
| 4,779,771 A | 10/1988 | Song | |
| 4,961,521 A | 10/1990 | Eckman | |
| 5,169,049 A | 12/1992 | Krupic et al. | |

(Continued)

FOREIGN PATENT DOCUMENTS

EP 0 335 505 10/1989

(Continued)

*Primary Examiner*—Dinh Q Nguyen
(74) *Attorney, Agent, or Firm*—Ryndak & Suri LLP

(57) ABSTRACT

A dispenser is provided for delivering a controlled quantity of a granular material. The dispenser includes a reservoir that retains granular material. The reservoir is supported in the dispenser with a passageway defined between opposing ends. A nozzle is provided for the outflow of material from the reservoir to a metering cup. A baffle is provided within the metering cup to stabilize the controlled volume directed into the cup from the reservoir. Once the metering cup is filled, the dispenser is inverted and the volume of material is directed from the cup, through the passageway and out of an opening adjacent a diffuser.

22 Claims, 7 Drawing Sheets

U.S. PATENT DOCUMENTS

| | | |
|---|---|---|
| 5,346,105 A | 9/1994 | Onneweer |
| 5,454,487 A | 10/1995 | Vassiliou |
| 5,467,903 A | 11/1995 | Sorensen et al. |
| 5,601,213 A | 2/1997 | Daniello |
| 5,711,463 A | 1/1998 | Chen et al. |
| 6,269,983 B1 | 8/2001 | Jones et al. |
| 6,516,973 B2 | 2/2003 | Chrisman et al. |
| 7,143,909 B2 | 12/2006 | Peterson et al. |
| 2005/0258189 A1 | 11/2005 | Peterson et al. |

FOREIGN PATENT DOCUMENTS

| | | |
|---|---|---|
| GB | 2119285 | 11/1983 |

* cited by examiner

METERED MATERIAL DISPENSER

CROSS-REFERENCE TO RELATED APPLICATIONS

This application claims priority to U.S. provisional patent application No. 60/811,987, filed on Jun. 8, 2006, the entire contents of which are incorporated by reference.

FIELD OF THE INVENTION

The present invention relates to dispensers for delivering a predetermined amount of granular/particulate material, e.g., seasonings, colorants, concentrates, powdered mixtures, etc.

BACKGROUND OF THE INVENTION

Dispensers are commonly employed to add seasonings and flavorings to foods and/or beverages. Typically, seasonings such as table salt and ground pepper are dispensed from shakers comprising a single-chamber container or reservoir. The container typically includes an end cap comprising a plurality of apertures to allow the material to be dispensed upon inverting and agitating the shaker. The size and number of apertures will vary with the type of material to be dispensed. For example, a dispenser for table salt will typically have fewer apertures than, for example, a pepper dispenser inasmuch as the density and concentration of table salt is such that smaller quantities are desired (i.e., with each oscillation of the container.) Generally, a dedicated dispenser with the appropriately sized/numbered apertures will be employed for each material to control the dispensing rate. While the size and number of apertures can control the flow rate of material, the user must monitor other variables such as the length of time, number of oscillations, etc., to accurately control the quantity of dispensed material.

Many prior art dispensers address the need to deliver a controlled or preset amount of material by employing two or more chambers and a delivery tube. A first chamber forms a material reservoir while a second chamber is calibrated for measuring the material. The chambers are typically stacked, one above the other or in tandem. The delivery tube communicates with the measuring chamber at one end, extends through the reservoir, and at the opposite end communicates with the apertures of the dispenser. See, e.g., Abbott U.S. Pat. No. 1,707,967; Trautvetter U.S. Pat. No. 1,763,449; and Gordon U.S. Pat. No. 2,644,616.

Yet another metered material dispenser is disclosed in Jones et al. U.S. Pat. No. 6,269,983. Therein, a measuring cup is disposed in one end of the dispenser for receiving material when the dispenser is face-up, i.e., with the dispensing end facing upwardly. When the dispenser is inverted, material flows into a passageway defined by and between co-axial, cylindrical containers. Once in the passageway, the material flows downwardly and out of a dispensing end or diffuser. The configuration and spacing of the containers restricts dispensing of excess material, even when agitated. This Jones patent is commonly assigned with the present application and is herein incorporated by reference.

Eckman U.S. Pat. No. 4,961,521 discloses an adjustable metered dispenser useful for delivering seasonings such as salt and pepper. Eckman's dispenser comprises two chambers arranged in seriatim. The first chamber is a material reservoir and the second chamber is a measuring chamber. Eckman's dispenser exhibits an ability to close the metering chamber from the reservoir chamber when the material is dispensed. Thus, in order to avoid over-dispensing, the user must be sure that the passageway between the two chambers is closed.

Krupic U.S. Pat. No. 5,169,049 discloses a dispenser for seasonings, such as salt and pepper. The shaker comprises three chambers: a material reservoir chamber, a measuring chamber and a dispensing chamber. The reservoir chamber is disposed between the measuring chamber and the dispensing chamber while a delivery tube communicates with the measuring chamber and the dispensing chamber. When the dispenser is not in use, the measuring chamber faces downwardly. During use, the dispenser is inverted, and the dispensing chamber is filled with the material from the measuring chamber. The material must then be dispensed by shaking the dispenser in the inverted position to evacuate the material from the dispensing chamber via a plurality of apertures. In order to prevent over dispensing, one embodiment of the device includes shake-back guards within the reservoir chamber.

Peterson et al. U.S. Pat. No. 7,143,909 shows a dispenser capable of dispensing a variable quantity of a material or for dispensing a variety of different materials. This Peterson application is commonly assigned with the present application and is herein incorporated by reference.

BRIEF SUMMARY OF THE INVENTION

A dispenser is provided for delivering a controlled quantity of a granular material. The dispenser comprises a container assembly, a diffuser and a metering cup. A baffle is provided for stabilizing the measured quantity of material prior to dispensing. The container assembly includes a reservoir disposed within a container and a passageway is defined around the reservoir. The reservoir is adapted for containing the granular material and defines a nozzle for the outflow of material. The metering cup is disposed in combination within the container assembly and has an open end adapted to receive a fixed quantity of material from the nozzle. The baffle is preferably positioned radially inward of the metering cup and adjacent the nozzle. Granular material is collected in the metering cup and engages the baffle, when the dispenser is disposed in a first orientation. The material is dispensed by inverting the container assembly, i.e., in a second orientation, such that material flows out of the metering cup, into the passageway and out onto the diffuser.

BRIEF DESCRIPTION OF THE DRAWINGS

For the purpose of illustrating the invention, the drawings show forms of the invention that are presently preferred. However, it should be understood that this invention is not limited to the precise arrangements and instrumentalities shown in the drawings.

DETAILED DESCRIPTION OF THE DRAWINGS

Figure 1:
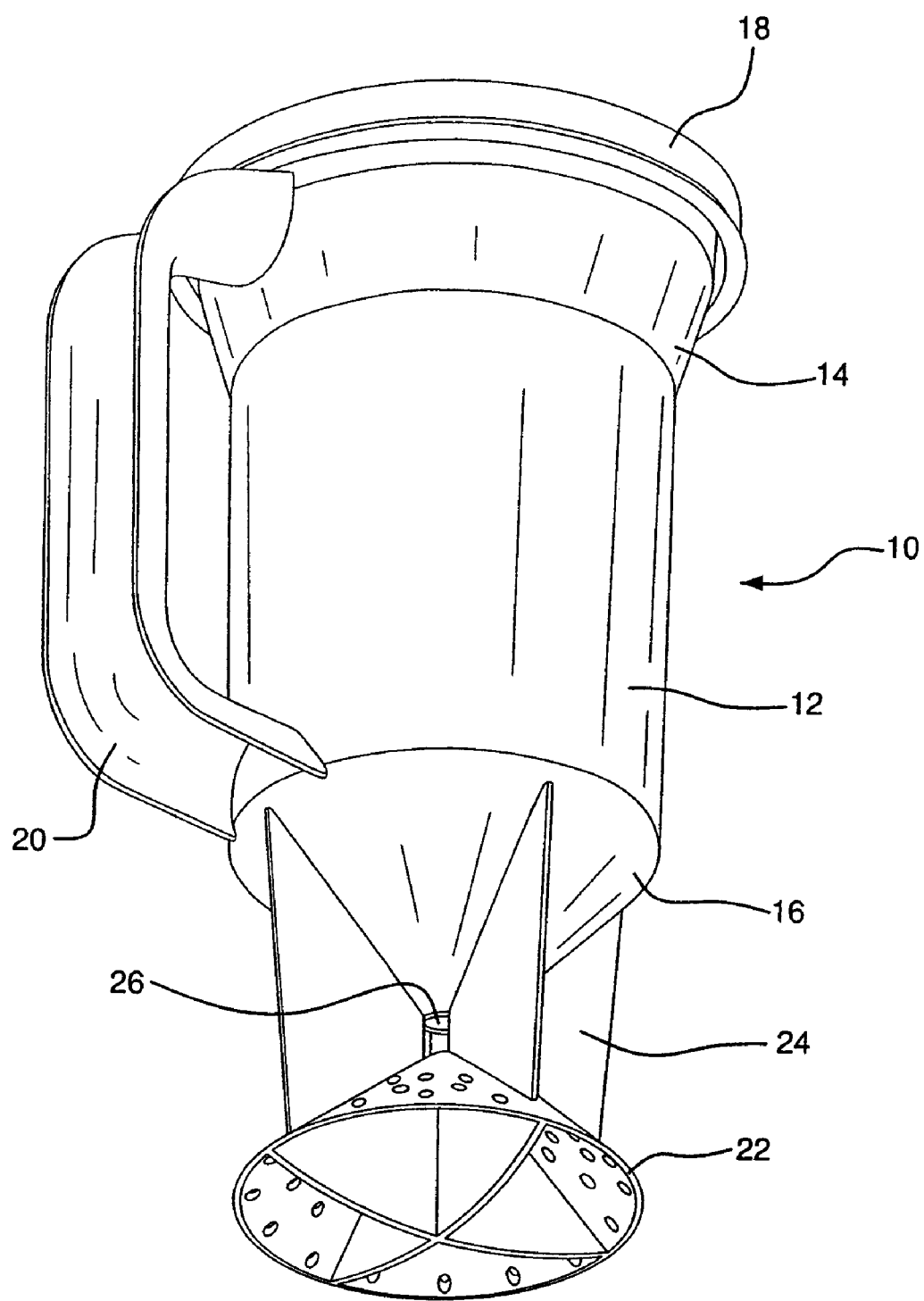
FIG. 1 is a perspective view of an embodiment of a dispenser according to the present invention as shown in a dispensing position.

Referring now to the drawings wherein like numerals indicate like elements, FIG. 1 depicts an exemplary embodiment of a dispenser 10 according to the present invention. The dispenser 10 is primarily used to dispense medium to coarse particulate material, such as salt, but may also be used to dispense fine or ultra-fine granular material, such as confection sugar, cinnamon or other such seasonings. Furthermore, while the teachings herein are described in the context of the food service/preparation industry, it will be appreciated that the teachings herein are applicable to measuring and dispensing any granular or particulate material. Examples include the measurement and delivery of particulate materials in the building industry, e.g., cements, stone dust, sand, or in the manufacturing industry, e.g., concentrate in plastics, colorants in wax, etc. As will become readily apparent from the following detailed description, the dispenser 10 is multi-purpose and may be reconfigured to dispense variable quantities of material or dispensing a variety of different materials.

The dispenser 10 comprises a central, generally cylindrical container or enclosure 12, which is to be loaded or filled with a granular material (not shown in FIG. 1). At one end of the container 12 is a flared end portion 14. At the opposite end of the container 12 is a cone shaped collector 16. A cap 18 is provided on the flared end 14 and a diffuser 22 is disposed at the collector end 16 via ribs 24. The ribs 24 support the diffuser 22 on the outside surface of the collector 16. A collector opening 26 is formed in the collector 16. As explained in more detail below, granular material falls from opening 26 and is diffused by diffuser 22 over a food product. A handle 20 is connected to the container 12 for holding and manipulating the dispenser 10 between the upward position and the inverted dispensing position. The dispenser 10 is preferably comprised of a rigid material such as plastic, metal or glass. However, it may be comprised of flexible materials.

Figure 2:
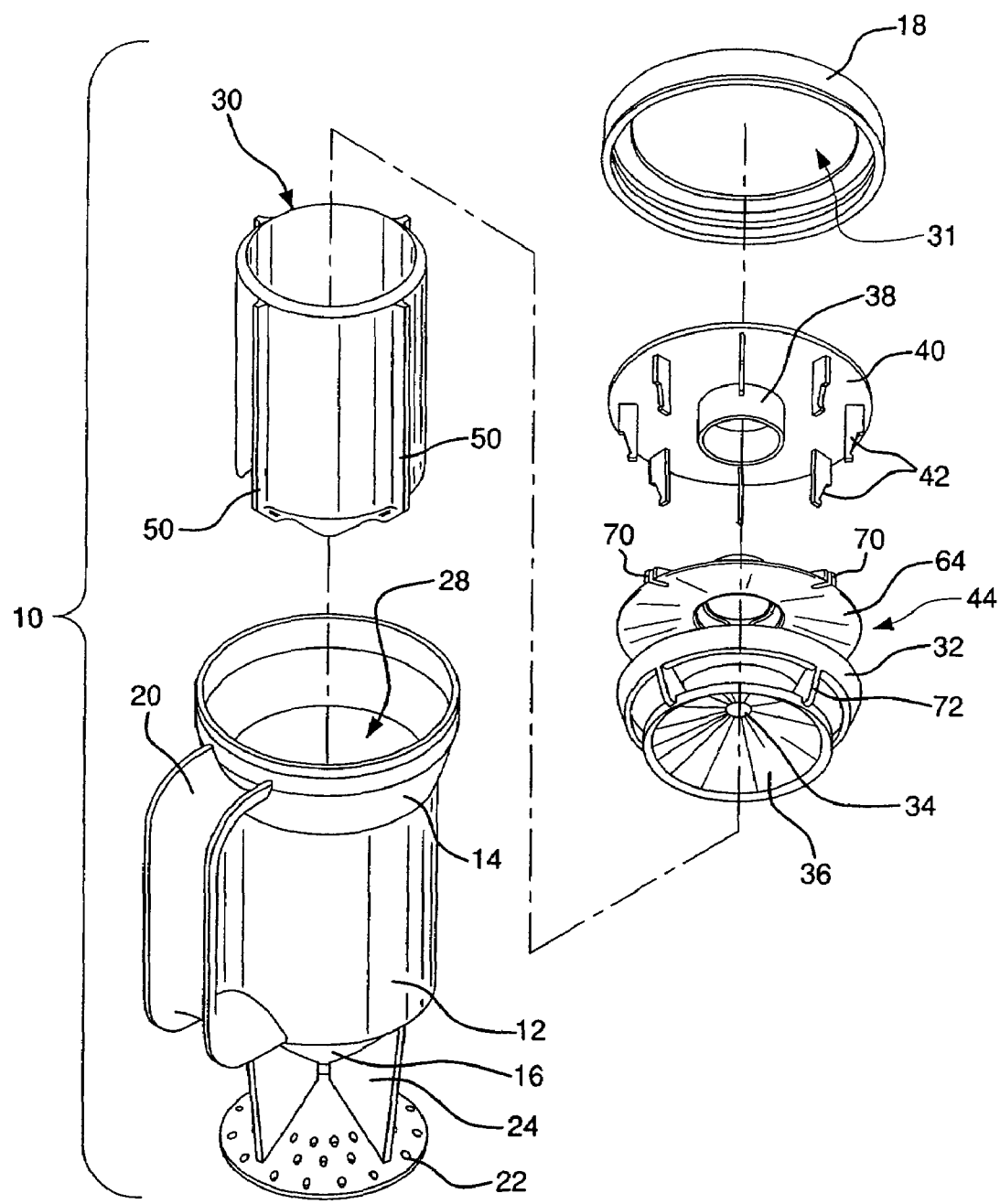
FIG. 2 is an exploded perspective view of the dispenser embodiment as shown in FIG. 1.
Figure 3:
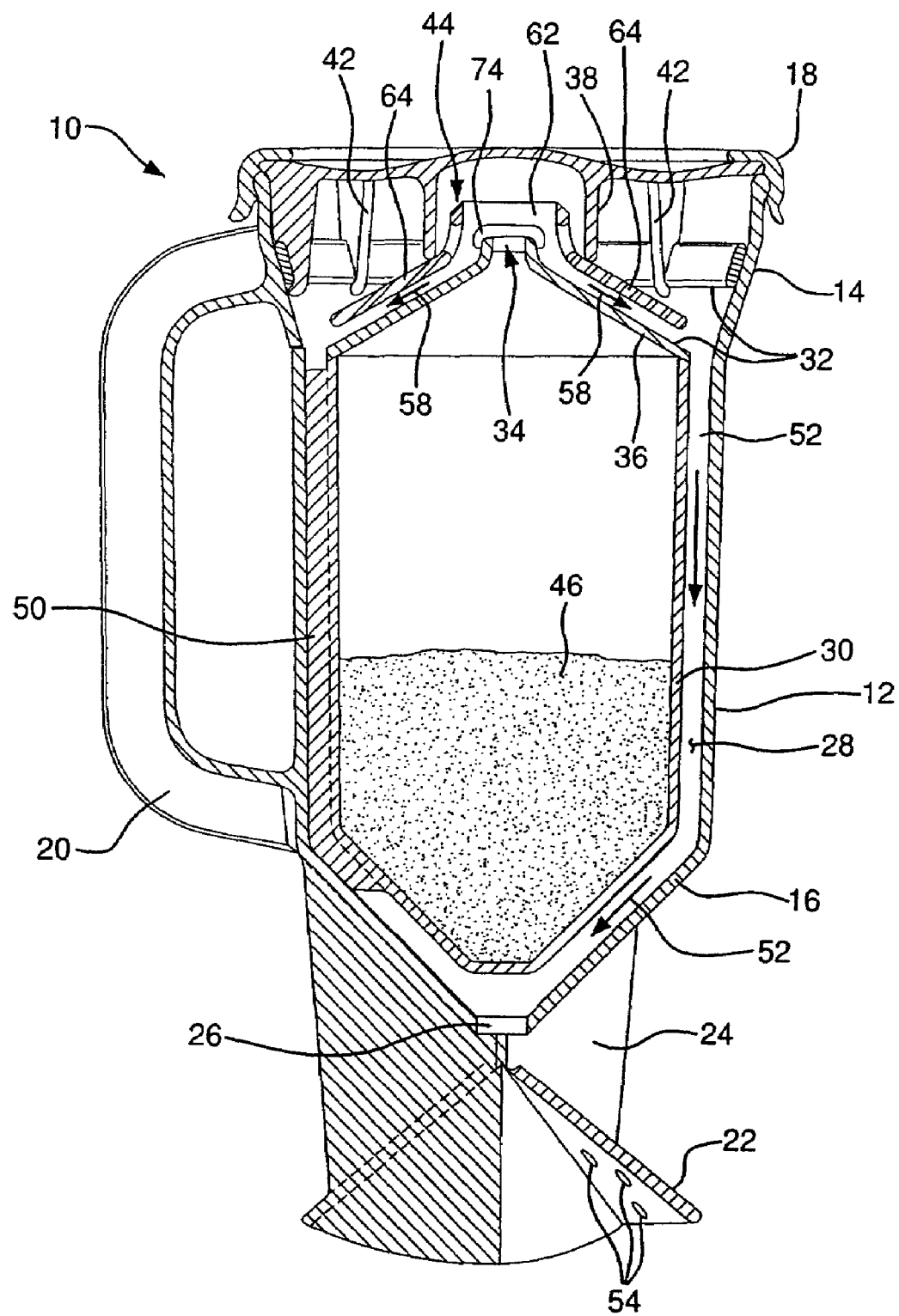
FIG. 3 is a cross sectional view of the dispenser embodiment as shown in FIGS. 1 and 2.

FIG. 2 is an exploded perspective view of the embodiment of the invention shown in FIG. 1. The container 12 defines an internal volume 28, which is accessible by removal of the cap 18 from the flared end 14 of the dispenser 10. An inner reservoir 30 is positioned within the internal volume 28. A plurality of fins 50 attached to or formed as part of the reservoir, position the reservoir 30 within the internal volume 28 of the container 12. The reservoir 30 may be removable from the container 12 when empty and replaced with a reservoir filled with a charge of material. As shown in FIG. 3, the reservoir 30 defines an internal volume that retains the material to be dispensed by the dispenser 10. The internal reservoir 30 includes a reservoir cap 32, which encloses one end of the reservoir 30. A nozzle 34 is defined at the base of an angled surface 36 of the cap 32. A metering cup 38 is provided on a wall portion 40 of the cap 18. The cap 18 is generally circular and has an area 31 into which the wall portion 40 snugly fits. The cap 18 and wall 40 may also be made as an integral unit.

Positioned between the wall portion 40 of the cap 18 and the reservoir cap 32 is a baffle 44, which is discussed in greater detail below. Slots 70 formed in a baffle plate 64 engage tabs 42, projecting from the wall portion 40. The slots 70 also engage reservoir ribs 72, which fixes the position of the baffle plate 64. As illustrated, the baffle 44 is removable. However, in another embodiment (not shown), the baffle is integrally formed with the reservoir cap 32. An open area 58 (FIG. 3) is defined between the baffle plate 64 and the angled surface on the outside of the reservoir cap 32.

Referring now to the cross section of FIG. 3, there is shown the enclosure of the container 12 having the internal reservoir 30 positioned therein. The outside dimension of the reservoir 30 is shown to be less than the internal dimension 28 of the container assembly 12 and defines a passageway 52 therebetween for directing granular material 46 from the metering cup 38 to the collector opening 26 for deposition onto the diffuser 22. As shown in cross section in FIG. 3, the fins 50 position the reservoir 30 within the internal volume 28 of the container 12. The angled surface 36 is spaced from the baffle plate 64 and defines the open area 58 which feeds the passageway 52.

As illustrated in FIG. 3, the dispenser 10 is in an inverted dispensing position (i.e., a "second orientation"). The dispenser 10 normally sits on its cap 18 with the diffuser 22 projecting upwardly. In this first position or orientation, the granular material 46 within the reservoir 30, by the force of gravity, moves downwardly to the angled surface 36 and a portion thereof passes through the nozzle 34 into an open end of the metering cup 38. (See FIG. 6.) Upon inverting the dispenser 10 to the position shown in FIG. 3, the volume of material in the metering cup 38 moves outside the angled surface 36 into the passageway 52, and across the collector 16 to the opening 26. The granular material discharges in this inverted position from the collector opening 26 and is diffused over the food product or the like by means of the diffuser 22. The diffuser 22 may include a series of openings 54 to assist in the spread of material.

The baffle 44 is provided adjacent the metering cup 38, nozzle 34 and reservoir 30. The baffle 44 is defined as an internal ring 62 that projects from a baffle plate 64 into the cup 38. The ring 62 is spaced from the bottom 38b of the cup 38 and has an outer diameter which is less than the inner diameter of the cup 38. The nozzle 34 directs the granular material 46 through the inside of the ring 62 into the cup 38. As the material fills the cup 38 (upon the dispenser being placed in the positioned shown in FIG. 3), the granular material 46 contacts the ring 62 and is stabilized within the cup 38.

Figure 7:
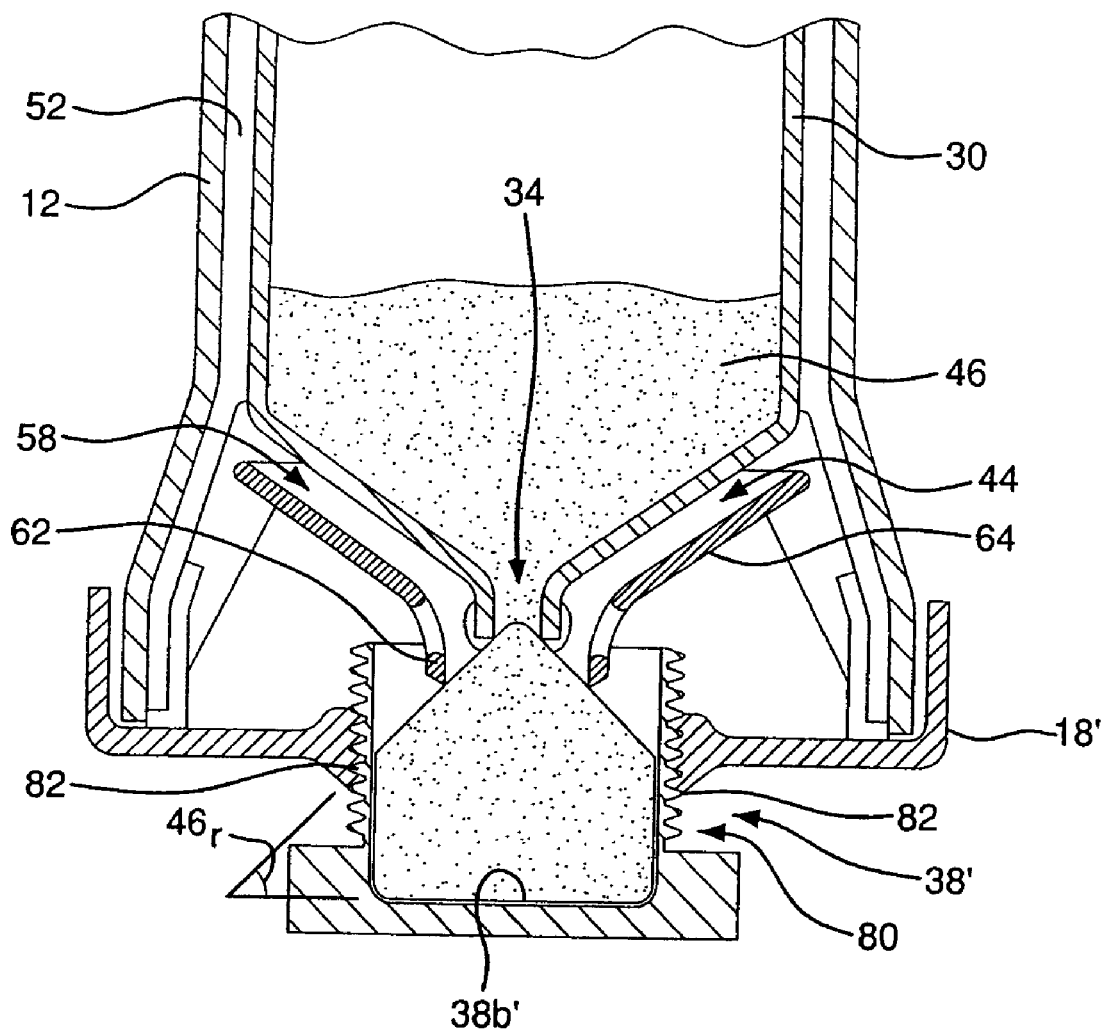
FIG. 7 is a partial cross sectional view of an alternate embodiment of the dispenser according to the present invention.

The baffle plate 64 extends radially outwardly from the metering cup 38 and is contacted by the sidewall structure of the metering cup 38 such that material within the metering cup is directed either through internal ring 62 or through flow openings 74 in the baffle plate 64. When the metering cup sidewall structure and baffle plate 64 are in contact, the outer circumferential edge of the baffle plate 64 preferably contacts the inner surface of the flared end portion 14 of the container 12. (This contact is not shown in FIG. 3). This prevents material, which may remain in the channel 52, from entering into the space above the baffle plate but outside the metering cup and possibly becoming lodged between the baffle plate and the wall portion 40 of the cap 18, which may happen when the dispenser 10 is jostled and then turned from the second to the first orientation. When the metering cup's 38 sidewall structure does not contact the baffle plate 64, for example, as shown in FIG. 7, the baffle plate 64 preferably does not contact the inner wall of the container so that material that escapes between the metering cup's 38 sidewall structure and the baffle plate 64 can flow into the channel.

Figure 4:
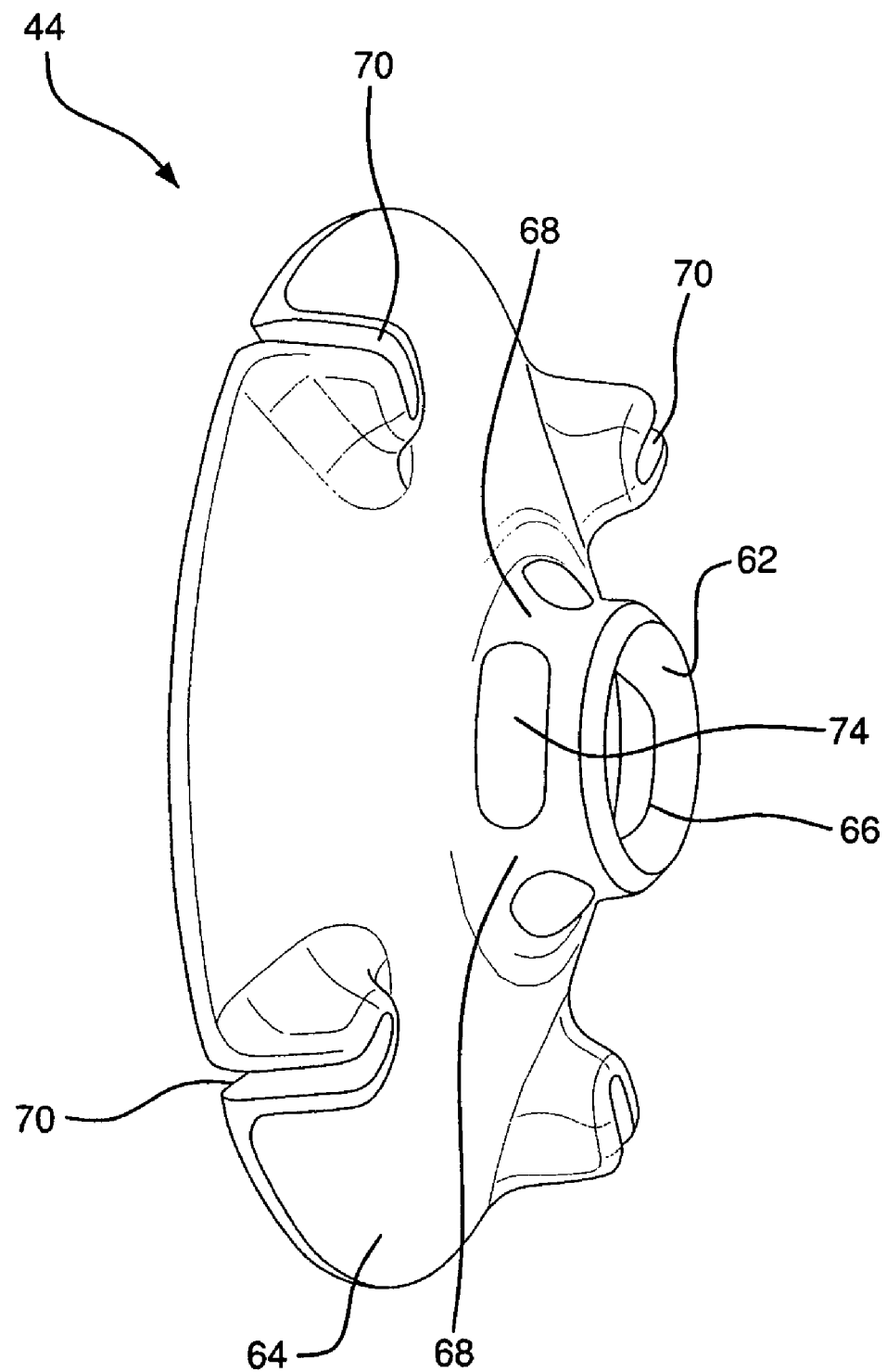
FIG. 4 is a perspective view of a baffle for use with the dispenser embodiment of FIGS. 1-3.
Figure 5:
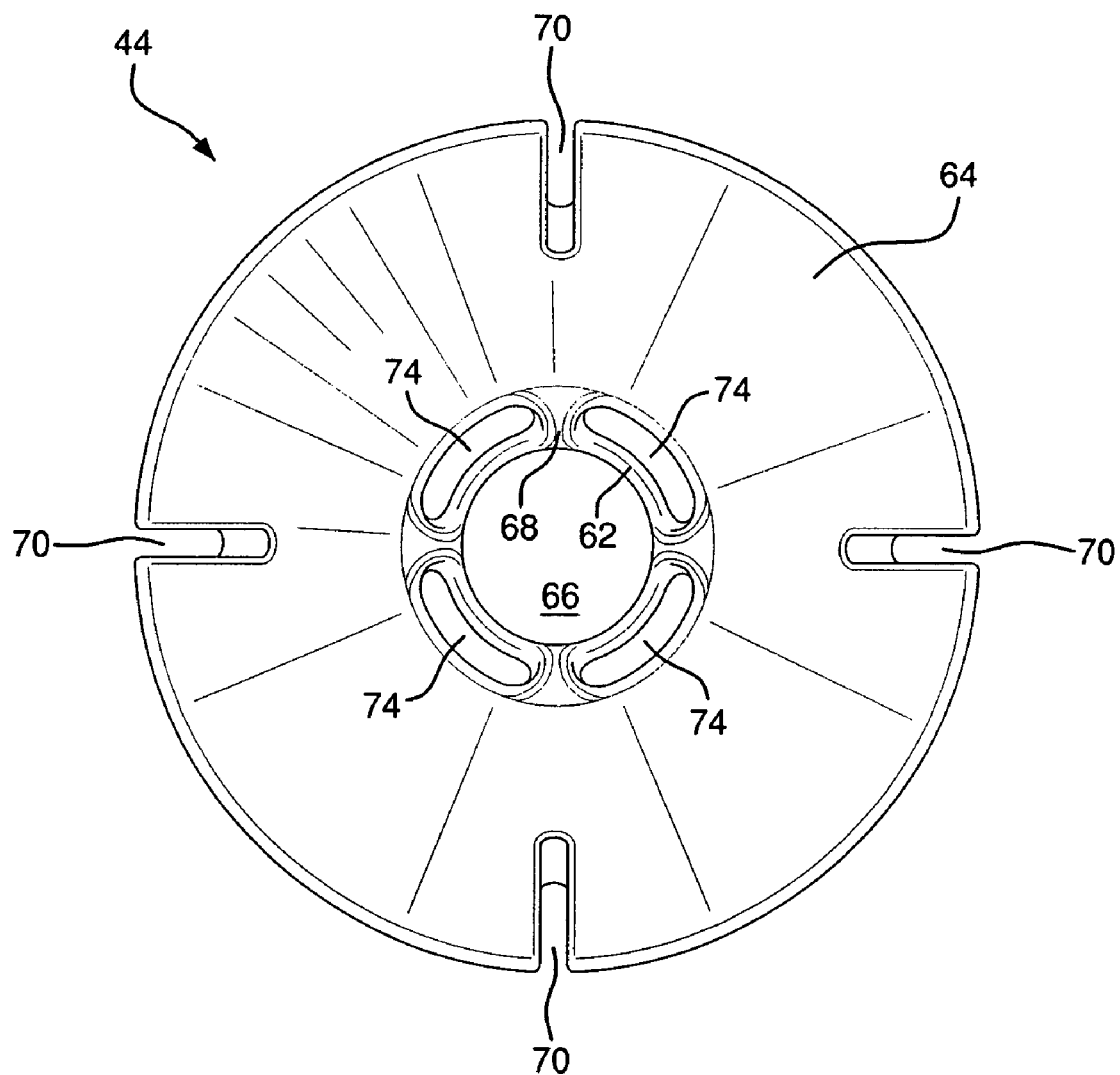
FIG. 5 is a plan view of the baffle shown in FIG. 4.

In FIGS. 4 and 5, a preferred structure of the baffle 44 is illustrated. Preferably, the baffle 44 is constructed from a rigid material such as metal or plastic but may be flexible. In FIG. 4, the baffle 44 is shown in perspective view with the baffle ring portion 62 positioned below a baffle plate 64 and suspended within a baffle opening 66 by ribs 68. The baffle opening 66 includes the open area in the center of the ring 62, with the flow openings 74 positioned around the ring between the ribs 68. A series of slots 70 are formed in the baffle plate 64 for engagement with the reservoir ribs 42 (see FIG. 2). An opening 58 (FIG. 3) is provided for direction of the granular material from the metering cup 38 through the space between the baffle plate 64 and angled surface 36. The material is thus free to flow around the outside of the angled surface 36 to the passageway 52 (see FIG. 3). A series of flow openings 74 are defined between the baffle support ribs 68. The flow openings 74 define the exhaust for the metering cup 38 into the open area 58. In other words, granular material 46 that initially flows outside of the ring 62 will fall through openings 74 and into open area 58.

FIG. 5 shows a top plan view of the baffle plate 64 with the baffle opening 66 in the center thereof. The opening 66 has a larger diameter than the diameter of the baffle ring 62. As shown, the baffle ring 62 outside dimension is positioned radially inward of the inside dimension of the flow openings 74. The flow openings 74 are also positioned inward of the inside diameter of the metering cup 38 and provide access from the cup to the open area 58. (See FIGS. 3 and 6.)

Figure 6:
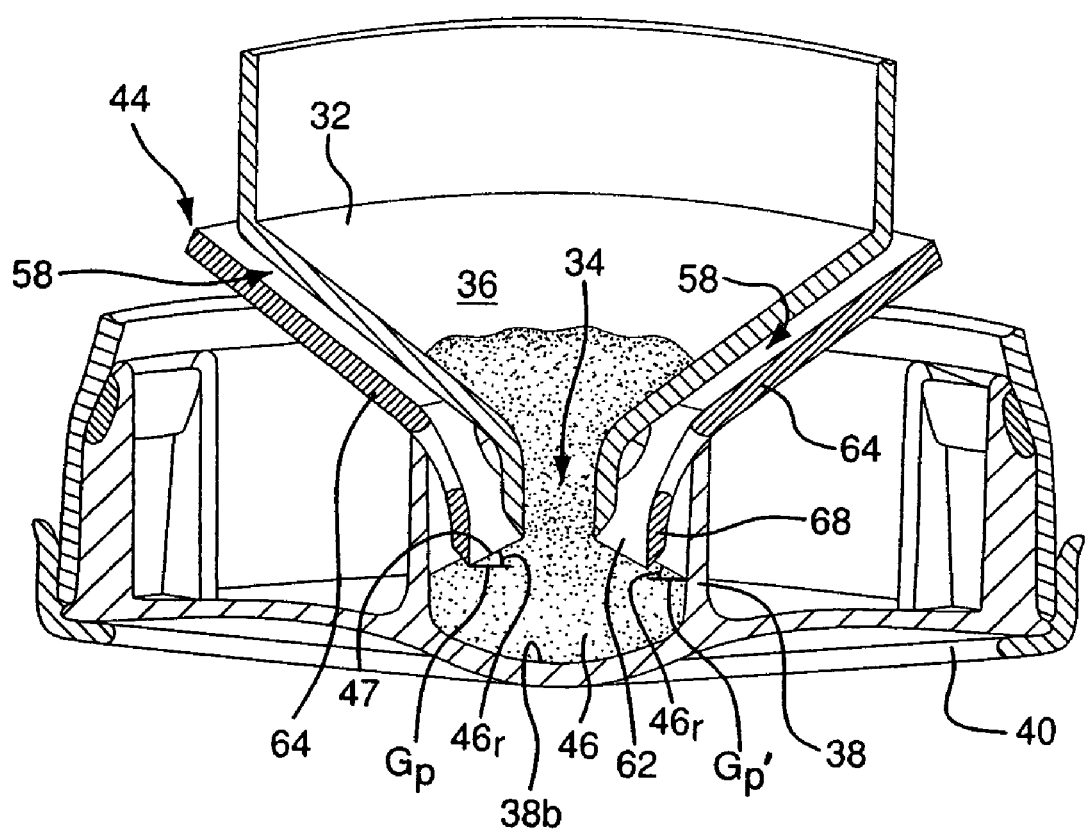
FIG. 6 is a partial cross sectional view of the baffle and metering cup portions of the dispenser of FIGS. 1-5.

In FIG. 6, the dispenser is in its first or loading orientation whereby granular material 46 is fed down the angled surface 36 and through the nozzle 34, filling the metering cup 38 within its base and sidewall structure (material has been removed from within surface 36 and reservoir 30 for clarity). When the dispenser is inverted to the discharge position (shown in FIG. 3), some granular material falls from metering cup 38 back into reservoir 30 via nozzle 34. The remaining material 46 falls through the inside of the baffle ring 62 and the flow openings 74 into the open area 58, for passage along the outside surface of cap 32 and into the passageway 52 (and eventually through the collector opening 26 to the diffuser 22).

As shown in FIG. 6, the quantity of material 46 within the internal reservoir 30 actually rests against the angled surface 36 of the reservoir cap 32. Additional granular material 46 flows through the nozzle 34 and comes to rest within the metering cup 38. The granular material 46 forms an angle of repose $46r$. The angle of repose $46r$ is the angle between the surface of the pile (i.e., the repose surface 47) and a horizontal ground plane, Gp. The repose surface 47 extends from the edge of the nozzle 34 to the wall of the metering cup 38. The baffle ring 62 is in contact with the granular material 46 adjacent to the repose surface. As shown, the baffle ring 62 may project inwardly into the material 46, such that the angle of repose $46r'$ outwardly of the baffle may be slightly different from the angle $46r$ of the portion of the material positioned inwardly of the baffle ring 62.

Generally, the baffle 44 serves to stabilize granular material within the metering cup 38. If the baffle ring 62 is removed, it is possible for the material 46 to shift laterally when the dispenser 10 is vibrated, jarred sideways or otherwise agitated. Thus, without the baffle 44, the vibration/movement of the dispenser 10 can dramatically change the angle of repose. Because the baffle ring 62 is positioned inwardly of the wall of the metering cup 38, but radially outwardly and axially below the nozzle, the baffle 44 serves to fix the position of the material within the cup. Therefore, the baffle ring 62 maintains a more constant angle of repose, even if the container 10 is jostled. Movement of the material 46 within the cup 38 is restricted by the ring 62 so any such movement will not significantly affect the amount of material within the cup. Thus, the material is more stable, will spread more evenly and the dispenser will not over dispense material. Upon inversion of the dispenser to the discharge position, the charge of material will flow out of the metering cup 38, through the baffle opening 66, both inwardly of the baffle ring 62 and through the openings 74 positioned between the baffle ring 62 and metering cup 38, and through the open area 58. The open area 58, between the reservoir cap and the baffle plate, directs the charge of material into the passageway 52.

The volume of material in the metering cup 38 is dependent upon the relationship between the position of the nozzle 34 and the bottom surface $38b$ of the metering cup 38, as well as the internal diameter of the cup. Thus, for a larger spacing between the nozzle 34 and the bottom surface $38b$ of the metering cup 38, a larger charge of granular material will be provided. (In, addition, the type of material will vary the angle of repose $46r$, $46r'$ within the metering cup 38.)

An adjustable metering cup is discussed in commonly assigned U.S. Pat. No. 7,143,909, which is herein incorporated by reference. FIG. 7 shows an adjustable metering cup 38' for use with the present invention. As shown in FIG. 7, an adjustment means 80 varies the relative axial position of the nozzle 34 and the base $38b'$ of the metering cup 38'. The metering cup 38' includes threads 82 disposed along the exterior of the metering cup 38' and the lid 18' forms a threaded aperture for engaging the cup threads 82. The threads 82 are substantially orthogonal to the material fill direction, e.g., the longitudinal axis of the nozzle 34, such that the metering cup 38' may translate axially toward or away from the nozzle 34. Accordingly, the axial spacing from the nozzle 34 to the base $38b'$ of the metering cup 38' is changed to vary the volume. Preferably, the threads 82 are relatively coarse such that one full rotation (i.e., 360 degree) of the metering cup 38' effects a meaningful change in the control volume. The volume of material 46 in the cup 38' fills to a position of contact with the baffle ring 62 to define a stabilizing angle of repose (as discussed above). This stabilizing effect is created by the relative position between the baffle ring and the cup.

In summary, the dispenser is capable of accurately delivering a controlled volume or quantity of granular material. The dispenser employs a simple, inexpensive mechanism for quickly and accurately measuring a quantity of granular material to be dispensed. The baffle within the metering cup stabilizes the material accumulation so that vibrations or movement of the dispenser do not materially alter the measured volume. The baffle is preferably positioned within the metering cup and is spaced radially inward thereof. The baffle preferably contacts the material in the cup, adjacent the upper surface of the material. Again, the contact between the baffle and the charge of material limits the effect of vibration or movement on the charge and thus serves to stabilize the measured quantity.

Although the invention has been described and illustrated with respect to the exemplary embodiments thereof, it should be understood by those skilled in the art that the foregoing and various other changes, omissions and additions may be made therein and thereto, without parting from the spirit and scope of the present invention.

What is claimed is:

1. A dispenser for delivering granular materials comprising:
    a container assembly having an outer enclosure and an inner reservoir for containing a granular material, said enclosure having an opening for the outflow of material, said enclosure and reservoir defining a passageway therebetween;
    said inner reservoir defining a nozzle for the outflow of material;
    a metering cup disposed at one end of the enclosure and having an open end opposing said nozzle, the metering cup adapted to receive a controlled quantity of material directed from the reservoir and through the nozzle, when the container assembly is disposed in a first orientation, and for delivering the material to the passageway, when the container is disposed in a second orientation; and a baffle including a generally annular baffle ring positioned within the metering cup for stabilizing the quantity of material directed into the cup.

2. The dispenser according to claim 1 wherein the metering cup comprises a base and a sidewall structure, wherein the nozzle and baffle are axially spaced from the base.

3. The dispenser according to claim 1 wherein the baffle is detachably retained within the container assembly.

4. The dispenser according to claim 1 wherein said metering cup defines an internal geometry and wherein said granular material accumulates to define a repose surface inclined at a repose angle relative to a ground plane, the controlled quantity of material being defined by said metering cup geometry and said repose angle, and the baffle ring positioned to engage the material adjacent the repose surface when the controlled quantity is filled within the metering cup.

5. The dispenser according to claim 1 further comprising a plurality of tabs for maintaining the axial position of the internal reservoir within the enclosure and for fixing the position of the baffle.

6. The dispenser according to claim 1 wherein the inner reservoir comprises a separate container that is removable from the container assembly.

7. The dispenser according to claim 1 wherein the relative position of the baffle and internal reservoir define an open area in communication with the passageway.

8. The dispenser according to claim 2 wherein the enclosure and the metering cup further comprise corresponding threads for rotatably fixing the metering cup to the enclosure and for adjusting the axial spacing between the metering cup and the nozzle.

9. A dispenser for delivering granular material cormprising:
a container assembly defining an enclosed volume;
a diffuser disposed at one end of the container assembly for spreading granular material dispensed from an opening within the assembly;
an inner reservoir for retaining granular material within the container assembly;
a passageway defined within the assembly for directing material to the opening;
a metering cup disposed at one end of the container assembly adjacent a nozzle in the reservoir, the metering cup defining a controlled volume for granular material transferred from the reservoir through the nozzle and, upon inversion of the container assembly, for delivering the controlled volume through the opening to the diffuser; and
a baffle having a generally annular baffle ring spaced radially outward of the nozzle and radially inward of the metering cup, the baffle ring positioned to engage a quantity of material within the metering cup.

10. The dispenser according to claim 9, the baffle ring being spaced axially below the nozzle and within the metering cup.

11. The dispenser according to claim 9 wherein the baffle further comprises at least one opening in communication with the passageway.

12. The dispenser according to claim 9 wherein the baffle comprises an angled baffle plate extending radially outward from the metering cup.

13. The dispenser according to claim 12 further comprising an outer surface of the inner reservoir positioned substantially parallel to the baffle plate.

14. A dispenser for delivering granular material comprising:
a container assembly having a passageway in communication with an opening for the outflow of granular material;
an inner reservoir for storing granular material, the inner reservoir positioned within the container assembly and having an opening for the outflow of granular material;
a metering cup coupled to the container assembly and positioned opposite the reservoir opening, the metering cup in communication with the reservoir opening for receiving a measured quantity of material from the reservoir and in communication with the passageway for discharging the measured quantity of material, and
a baffle comprising a generally annular baffle ring positioned within the metering cup, the baffle ring spaced axially from the reservoir opening and radially inward of the metering cup, the baffle ring positioned to contact the measured quantity of material received within the metering cup.

15. A dispenser according to claim 1, wherein the baffle ring is disposed generally coaxially with the nozzle and with the metering cup.

16. A dispenser according to claim 9, wherein the baffle ring is disposed generally coaxially with the nozzle and with the metering cup.

17. A dispenser according to claim 14, wherein the baffle ring is disposed generally coaxially with the reservoir opening and with the metering cup.

18. A dispenser for delivering granular materials comprising:
a container assembly having an outer enclosure and an inner reservoir for containing a granular material, said enclosure having an opening for the outflow of material, said enclosure and reservoir defining a passageway therebetween;
said inner reservoir defining a nozzle for the outflow of material;
a metering cup disposed at one end of the enclosure and having an open end opposing said nozzle, the metering cup adapted to receive a controlled quantity of material directed from the reservoir and through the nozzle, when the container assembly is disposed in a first orientation, and for delivering the material to the passageway, when the container is disposed in a second orientation; and
baffle means positioned within the metering cup for stabilizing the quantity of material directed into the cup, wherein the baffle means is detachably retained within the container assembly.

19. A dispenser for delivering granular materials comprising:
a container assembly having an outer enclosure and an inner reservoir for containing a granular material, said enclosure having an opening for the outflow of material, said enclosure and reservoir defining a passageway therebetween;
said inner reservoir defining a nozzle for the outflow of material;
a metering cup disposed at one end of the enclosure and having an open end opposing said nozzle, the metering cup adapted to receive a controlled quantity of material directed from the reservoir and through the nozzle, when the container assembly is disposed in a first orientation, and for delivering the material to the passageway, when the container is disposed in a second orientation; and
baffle means positioned within the metering cup for stabilizing the quantity of material directed into the cup,
wherein said metering cup defines an internal geometry and wherein said granular material accumulates to define a repose angle, the controlled quantity of material being defined by said metering cup geometry and said repose angle, and the baffle means positioned to engage the material adjacent the repose angle when the controlled quantity is filled within the metering cup.

20. A dispenser for delivering granular materials comprising:
   a container assembly having an outer enclosure and an inner reservoir for containing a granular material, said enclosure having an opening for the outflow of material, said enclosure and reservoir defining a passageway therebetween;
   said inner reservoir defining a nozzle for the outflow of material;
   a metering cup disposed at one end of the enclosure and having an open end opposing said nozzle, the metering cup adapted to receive a controlled quantity of material directed from the reservoir and through the nozzle, when the container assembly is disposed in a first orientation, and for delivering the material to the passageway, when the container is disposed in a second orientation; and
   baffle means positioned within the metering cup for stabilizing the quantity of material directed into the cup, wherein the relative position of the baffle means and internal reservoir define an open area in communication with the passageway.

21. A dispenser for delivering granular material comprising:
   a container assembly defining an enclosed volume;
   a diffuser disposed at one end of the container assembly for spreading granular material dispensed from an opening within the assembly;
   an inner reservoir for retaining granular material within the container assembly;
   a passageway defined within the assembly for directing material to the opening;
   a metering cup disposed at one end of the container assembly adjacent a nozzle in the reservoir, the metering cup defining a controlled volume for granular material transferred from the reservoir through the nozzle and, upon inversion of the container assembly, for delivering the controlled volume through the opening to the diffuser; and
   a baffle spaced radially outward of the nozzle and radially inward of the metering cup, the baffle positioned to engage a quantity of material within the metering cup, wherein the baffle further comprises at least one opening in communication with the passageway.

22. A dispenser for delivering granular material comprising:
   a container assembly defining an enclosed volume;
   a diffuser disposed at one end of the container assembly for spreading granular material dispensed from an opening within the assembly;
   an inner reservoir for retaining granular material within the container assembly;
   a passageway defined within the assembly for directing material to the opening;
   a metering cup disposed at one end of the container assembly adjacent a nozzle in the reservoir, the metering cup defining a controlled volume for granular material transferred from the reservoir through the nozzle and, upon inversion of the container assembly, for delivering the controlled volume through the opening to the diffuser; and
   a baffle spaced radially outward of the nozzle and radially inward of the metering cup, the baffle positioned to engage a quantity of material within the metering cup, wherein the baffle comprises an angled baffle plate extending radially outward from the metering cup,
   further comprising an outer surface of the inner reservoir positioned substantially parallel to the baffle plate.

* * * * *